United States Patent [19]
Brille

[11] 3,795,231
[45] Mar. 5, 1974

[54] COLD STARTING DEVICES FOR DIESEL ENGINES WITH COMPENSATED SUPERCHARGING

[75] Inventor: Maurice G. Brille, Suresnes, France

[73] Assignee: Societe Anonyme De Vehicyles Industriels Et D'Equipements Mecaniques Saviem, Suresnes, France

[22] Filed: May 12, 1972

[21] Appl. No.: 252,572

[30] Foreign Application Priority Data
May 25, 1971 France .............................. 71.18883

[52] U.S. Cl. ............ 123/119 CB, 60/13, 123/179 D
[51] Int. Cl. ........................................... F02b 37/06
[58] Field of Search 60/13; 123/119 CB, 179 D, 179 CC,
123/179 E

[56] References Cited
UNITED STATES PATENTS

| | | | |
|---|---|---|---|
| 3,595,013 | 7/1971 | Brille et al. | 60/13 |
| 3,712,280 | 1/1973 | Brille et al. | 60/13 |
| 2,585,029 | 2/1952 | Nettel | 60/13 |
| 3,163,984 | 1/1965 | DuMont | 60/13 |
| 3,676,999 | 7/1972 | Oldfredd | 60/13 |
| 1,167,509 | 1/1916 | MacDonald | 123/179 D |

Primary Examiner—Carlton R. Croyle
Assistant Examiner—Warren Olsen
Attorney, Agent, or Firm—Stevens, Davis, Miller & Mosher

[57] ABSTRACT

This device comprises a separate electromotor coupled to the driving shaft of a volumetric supercharger for correcting the turbo compressor supercharging of the Diesel engine; clutch means are interposed between this shaft and a variable-speed transmission comprising extensible pulleys, said electromotor driving said shaft directly only when starting the engine by very cold weather so that this shaft revolves faster than the extensible pulley driving the shaft under normal operating conditions.

A solenoid operated valve inserted in a pipe connecting the induction manifold of the engine to free atmosphere is adapted, when said electrometer starts in cold weather conditions, to open and vent the manifold to the free atmosphere in conjunction with the energization of the starter motor of the engine and to close before the deenergization of the starter motor.

1 Claim, 3 Drawing Figures

COLD STARTING DEVICES FOR DIESEL ENGINES WITH COMPENSATED SUPERCHARGING

The present invention relates to means for cold starting Diesel or compression-ignition engines equipped with a compensated supercharger.

In a prior U.S. Pat. No. 3,595,013 of July 27, 1971, the applicant disclosed a Diesel engine supercharged in a particular manner, which comprises a turbo-compressor as well as a heat exchanger or transfer device and a volumetric supercharger driven with a variable speed ratio from the engine, to permit the desired regulation of the temperature and pressure of the engine feed air.

The essential object of the above-mentioned U.S. Pat. No. 3,595,013 was to reduce the induction temperature under full load conditions while increasing as much as possible this temperature under low-load conditions, in order to reduce the pollution by exhaust gas and permit the operation of the engine with multiple fuels.

Unfortunately, as mentioned in said patent the reheating action is not obtained under cold starting conditions because the exchanger itself is cold and the volumetric supercharger rotates too slowly, so that its considerable leakages prevent the building up of a pressure sufficient for inducing a temperature increment.

To avoid this inconvenience, still in accordance with the aforesaid U.S. Pat. No. 3,595,013, when starting a cold engine the volumetric supercharger is disconnected from its variable-ratio drive and driven directly from the starter motor of the internal combustion engine with a step-up ratio representing several times the maximum step-up ratio given by the variable-speed drive.

Now it may prove advantageous in certain operating conditions to disconnect completely the volumetric supercharger speed from the engine speed, and therefore to drive the former from means other than the usual starter motor.

In view of the foregoing, it is the chief object of the present invention to obtain this complete independence by driving the volumetric supercharger directly from a separate electric motor during the starting period alone. This is made possible, provided that a freewheel or clutch coupling is interposed between the variable-speed drive and the supercharger, as in the aforesaid patent.

The electric motor employed to this end may advantageously be used as a voltage generator or dynamo under normal operating conditions; of course, the use of an alternator is precluded since the current source is the storage battery supplying direct current. Actually, the alternator constitutes an improvement, since the absence of collector permits its operation at higher speeds with a higher transmission ratio from the engine, so as to charge the battery at lower speeds. But in the specific case considered herein the electric voltage generator or dynamo will rotate, like the volumetric supercharger, with a variable speed ratio whereby at idling speeds the maximum step-up ratio is obtained, so that it will begin to charge the battery, whereas at high engine speed its speed will be relatively low, thus eliminating the collector troubles encountered with direct-current electric motors.

According to the temperature of the surrounding atmosphere, the starter motor and the electromotor driving the volumetric supercharger may be started either simultaneously or separately.

To permit a greater flexibility and liberty in the desired starting conditions a leakage in the induction manifold, adapted to be sealed at the proper time, may also be contemplated.

Other features and advantages of this invention will appear as the following description proceeds with reference to the accompanying drawing, in which.

Figure 1:
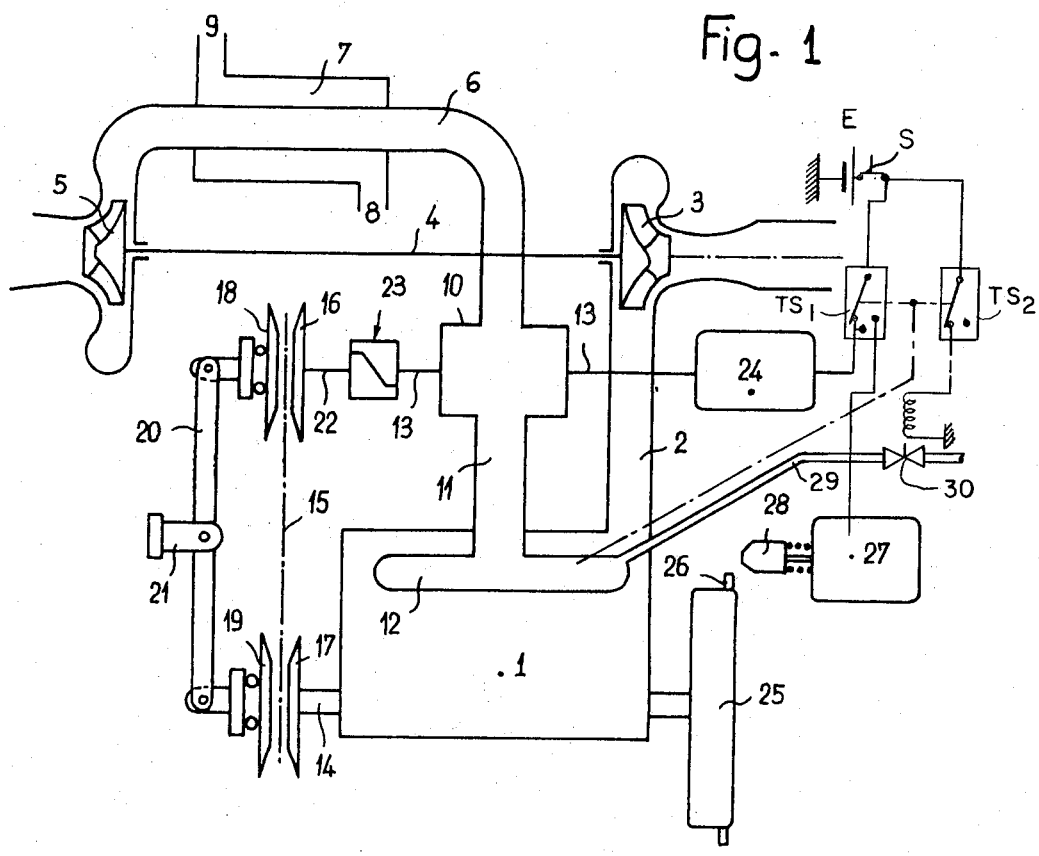
FIG. 1 illustrates the general layout of the power unit according to this invention, which includes most of the component elements illustrated in FIG. 2 of the above-mentioned patent.
Figure 2:
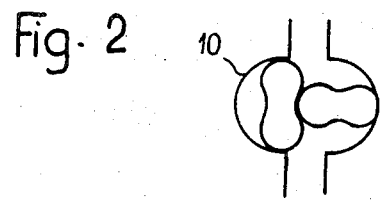
FIG. 2 is a cross section showing the volumetric supercharger.

Referring first to FIG. 1, the compression-ignition internal combustion engine 1 comprises an exhaust manifold 2, the turbine 3 of turbo-compressor 5 and the shaft 4 driving this compressor, the pipe 6 for delivering the engine feed air, which passes through the heat exchanger 7 connected through inlet and outlet pipes 8, 9 to the water cooling system of the engine.

The air is directed through pipe 6 into the volumetric supercharger 10 and forced by the latter into the engine induction pipe 11 and manifold 12.

The shaft 13 driving the volumetric supercharger 10 is coupled to the engine crankshaft 14 via a transmission belt 15 and a pair of pulleys having their flanges 16, 18 and 17, 19 relatively movable in the axial direction. The flanges 18, 19 are adapted to be moved simultaneously through a compensation bar 20 fulcrumed intermediate its ends to a movable strap 21. The shaft 13 is not driven directly through pulley 16, 18 but through an intermediate shaft 22 and a freewheel device 23; said shaft 13 has an extension on the opposite side of the supercharger 10 for driving an electromotor and dynamo unit 24. The engine flywheel 25 and its peripheral toothed ring 26 may be driven in the conventional manner from the starter motor 27 and its drive 28; the induction manifold 12 of the engine is provided with a pipe 29 leading to the free atmosphere and adapted to be closed by a solenoid-operated valve 30.

The general operation of the power unit described hereinabove is the same as in the case of the power unit described and illustrated in the above-mentioned U.S. patent No. 3,595,013; therefore, only the starting thereof will be described in detail hereinafter.

In the case of a normal starting of a warm engine, the component element added to the power unit according to this invention remain inoperative; thus, the solenoid-operated valve 30 remains closed, the electromotor and dynamo unit 24 is still connected as a dynamo and therefore no current is fed thereto; the engine is rotated in the known manner by the starter motor 27 and the belt 15 and free-wheel 23 drive the volumetric supercharger 10 through the maximum speed ratio, which is amply sufficient for starting the warm engine 1.

In contrast thereto, when the engine is cold the current supplied from the storage battery E is fed by means of a starter switch S to the electromotor 24 through a thermostatic change over switch $TS_1$ (as schematically shown in FIG. 1) which is provided with a timing mechanism (not shown), so that the supercharger 10 is driven as fast as permitted by the power rating of this electromotor, the freewheel 23 enabling the shaft 13 to rotate much faster than shaft 22; a certain pressure builts up in the induction pipe 11 and manifold 12; the leakages from supercharger 10 are recycled and therefore the temperature increases rapidly in manifold 12, thus facilitating the starting. When the engine 1 is started, it drives the volumetric supercharger 10 through the freewheel 23, so that electromotor 24 is converted into a generator or dynamo.

Figure 3:
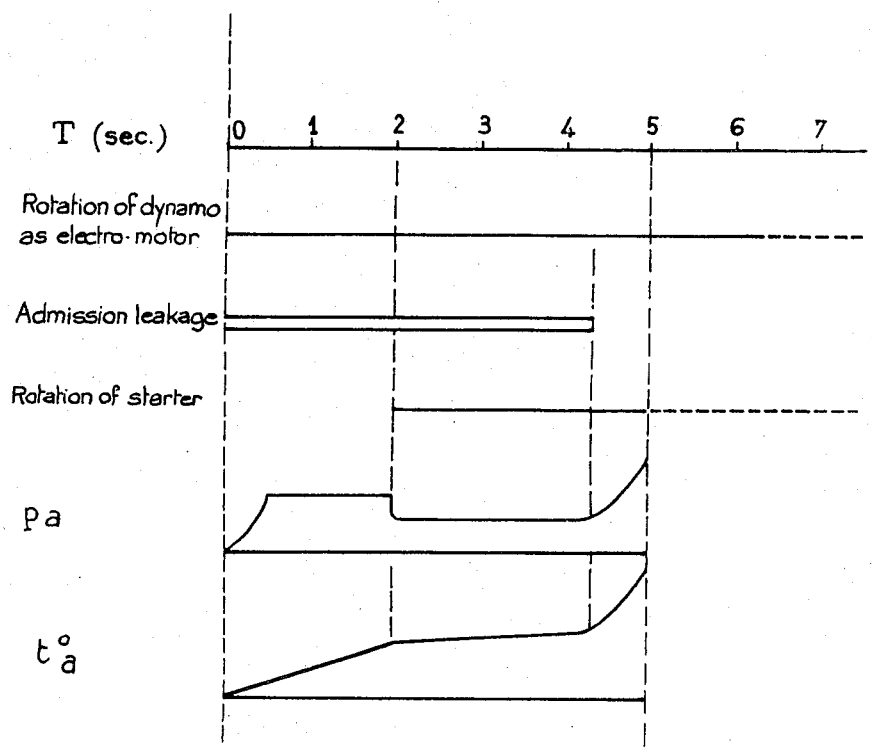
FIG. 3 is a diagram illustrating the sequence of steps contemplated in the case of an engine starting by very cold weather.

Under very cold weather conditions the starting sequence illustrated in FIG. 3 may be described as follows :

When the driver depresses the starter switch button S the electromotor 24 drives the volumetric supercharger 10 and the compressed air in manifold 12 can escape partially through the then open solenoid-operated valve 30 which is energized by the battery E and switch S through a thermostatic switch $TS_2$ that is provided with a timing mechanism (not shown); these operations are programmed for the initial two-second period. The speed of volumetric supercharger 10 is then as high as afforded by the power output of electromotor 24 with a relatively high and constant induction air pressure $p_a$ and an induction temperature $t°_a$ rising regularly as a consequence of the recycling of leakages.

After this 2 second period, for instance, the starter motor 27 is energized by means of the timing mechanism of thermostatic change-over switch $TS_1$ for imparting a certain torque to the internal combustion engine 1; the induction pressure $p_a$ drops slightly since the engine output provides an additional escape for the air, and the induction temperature $t°_a$ rises only moderately; at the fifth second the solenoid-operated valve 30 is closed after being deenergized by the action of the timing mechanism of thermostatic switch $TS_2$, electromotor 24 continues to rotate at the preceding speed, pressure $p_a$ rises considerably and temperature $t°_a$ rises very strongly, thus starting the engine.

The subsequent steps remain unchanged: thus, the starter motor 27 is disconnected through its drive 28, supercharger 10 is again driven through its variable-speed drive and the positively connected freewheel 23, and electromotor 24 operates as a dynamo.

Of course, the switching from warm-starting to cold-starting conditions is controlled by means of suitable thermostats (not shown).

It should be noted that the dynamo 24 cannot exceed a predetermined speed of, say, 3,000 r.p.m., irrespective of the engine operating conditions; on the other hand, if the engine is assumed to have an idling speed of 500 r.p.m., said dynamo will be driven at about 1,000 r.p.m.; therefore, its speed range is very narrow and the dynamo will constantly operate under satisfactory conditions.

Of course, the manifold 12 is head-insulated as already claimed in the U.S. Pat. No. 3,712,280.

It will be seen that any sudden increment in the temperature and pressure when closing the solenoid-operated valve 30 cannot last more than a few cycles for starting the engine. What is claimed as new is:

1. A device for cold starting a diesel engine having a compensated supercharging device with a turbosupercharger, a heat exchanger in the duct connecting said turbosupercharger to the engine, a volumetric supercharger inserted between said turbosupercharger and the induction manifold of said engine and having a driving shaft connected to the engine crankshaft via a variable-speed transmission comprising a belt and a pair of pulleys having axially movable flanges, clutch means interposed between said shaft and said transmission for disconnecting said volumetric supercharger from said transmission, and an electric starter motor of the engine, the device for cold starting comprising a separate electromotor coupled to said shaft directly for driving it only during the cold starting of said engine with a speed higher than the variable speed transmission pulley driving said shaft under normal operating conditions, said device further comprising a pipe having one end connected permanently to said induction manifold of the engine and having its other end open and connected to the free atmosphere, a solenoid-operated valve mounted in said pipe, and means for energizing said valve when said electromotor is starting by very cold weather, to open it and to vent said manifold to the free atmosphere in conjunction with timing means for a delayed energization of said starter motor, whereby said valve is deenergized for closing said vent pipe before de-energizing said starter motor.

* * * * *

UNITED STATES PATENT OFFICE
CERTIFICATE OF CORRECTION

Patent No. 3,795,231  Dated March 5, 1974

Inventor(s) Maurice G. Brille

It is certified that error appears in the above-identified patent and that said Letters Patent are hereby corrected as shown below:

In the Heading:

Please correct the spelling of the Assignee to read:
-- Societe Anonyme De Vehicules Industriels
   Et D'Equipements Mecaniques Saviem --.

Signed and sealed this 1st day of October 1974.

(SEAL)
Attest:

McCOY M. GIBSON JR.
Attesting Officer

C. MARSHALL DANN
Commissioner of Patents